United States Patent [19]

Feldman et al.

[11] Patent Number: 4,769,715
[45] Date of Patent: Sep. 6, 1988

[54] DIGITAL IMAGE DISPLAY AND PHOTOGRAPHIC RECORDING APPARATUS

[75] Inventors: Samuel Feldman, San Francisco; David Haddick, Berkeley, both of Calif.

[73] Assignee: LogE/Dunn Instruments, Inc., San Francisco, Calif.

[21] Appl. No.: 936,428

[22] Filed: Dec. 1, 1986

[51] Int. Cl.⁴ .............................................. H04N 5/76
[52] U.S. Cl. .................................... 358/244; 358/332; 358/345; 346/110 R
[58] Field of Search ...................... 358/244, 332, 345; 346/110 R

[56] References Cited

U.S. PATENT DOCUMENTS 4,704,699 11/1987 Farina et al. ..................... 358/332 X Primary Examiner—Robert L. Richardson
Attorney, Agent, or Firm—Pollock, Vande Sande & Priddy

[57] ABSTRACT

Method and apparatus for generating photographic copies from a CRT display of digital pixel data. The digital pixel data is received from a host digitizing device as a series of lines to be displayed. The series of lines comprises a complete frame of image data. The digital data is used to time modulate a constant intensity CRT beam to accurately control the exposure of a photographic film. Control over the exposure is effected by scanning each line of the image frame a plurality of times. The number of times each pixel data is displayed with a constant intensity determines the total exposure produced by each pixel on the photographic film. By scanning individual lines of a rasterized picture a plurality of times, accurate control over the exposure of the photographic film may be controlled using the constant beam intensity.

12 Claims, 5 Drawing Sheets

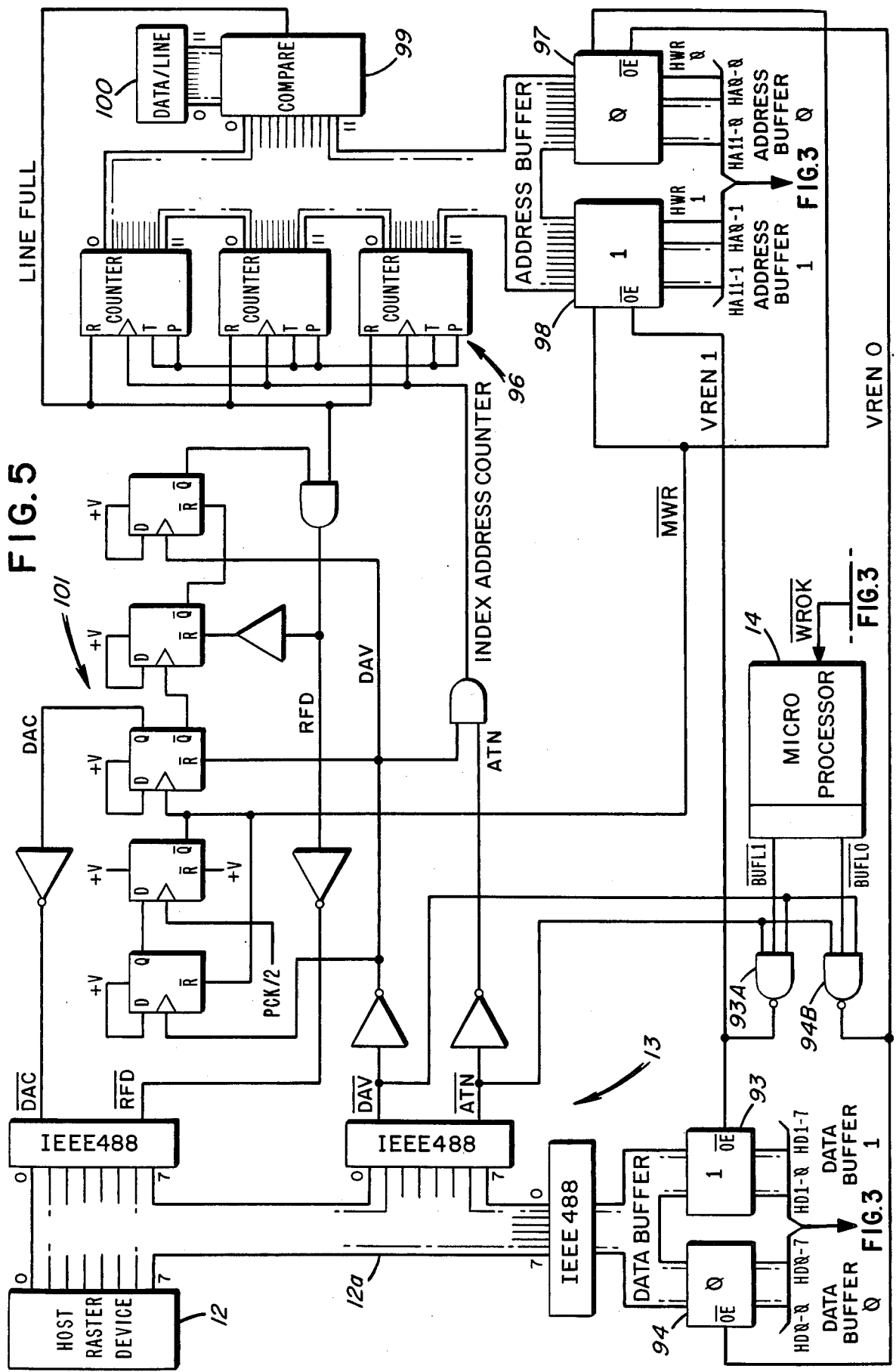

DIGITAL IMAGE DISPLAY AND PHOTOGRAPHIC RECORDING APPARATUS

The present invention relates to the production of photographic copies of cathode ray tube generated images. Specifically, a video monitor for processing digital pixel data is provided having a gray scale resolution commensurate with the digital pixel data resolution.

Numerous techniques for generating CRT images suitable for photographing are described in the art. These techniques typically employ analog signal processing where separate color images are formed on the CRT representing red, green or blue detail to generate three separate exposures on a photographic film. A panchromatic CRT generates an image of each of the color signals, and the film is exposed through one of three color separation filters. The filters will enable individual recording of the red, green and blue color image portions from the monochromatic CRT image.

U.S. Pat. No. 4,438,453 describes one such technique for generating color photographic copies of a CRT generated image. The apparatus of the '453 patent processes an analog video signal separated into its constituent red, green and blue component signals. Each of the separated signals forms multiple frames in sequence of pixel data on the CRT. The total exposure of the film is the summation of the exposure produced by the multiple frames. The apparatus of the '453 patent varies the length of time each pixel is to expose the film by displaying the pixel only during a selected group of frames. The display intensity of each displayed pixel is maintained constant. Controlling the number of frames during which a pixel is displayed controls the total exposure of the film due to the pixel.

U.S. Pat. No. 4,473,849 to Cool describes a technique for varying the exposure time in another system for creating photographic copies of CRT generated images. The Cool '849 patent provides for gamma correction by generating a threshold intensity control signal which is swept at a varying rate corresponding to a gamma correction curve. If the instantaneous amplitude of an analog video signal exceeds the threshold, the CRT beam is turned on at a constant intensity. Thus, control over exposure is effected by exposing the photographic film for specific instances of time, marked by the duration in time that the video signal exceeds a threshold level. The film integrates the time modulated pixel illumination to provide the ultimate desired exposure.

Each of these techniques requires an analog video signal at least during some portion of the video image production. A source of digital pixel data for generating images would necessarily have to be converted to an analog signal. During the conversion of the digital signal to an analog video signal, problems of level stability, noise, band width limitations and preservation of gray scale resolution result.

Additionally, other prior art image display devices which convert digital data to analog signals produce digital to analog converter "glitches" which distort the displayed image. The avoidance of the digital to analog converter would avoid the production of these anomalies. Thus, it would be advantageous to directly display digital pixel data without its conversion to an analog video signal.

SUMMARY OF THE INVENTION

It is an object of this invention to provide digital processing of digital image data for display on a cathode ray tube monitor.

It is a further object of this invention to preserve gray scale resolution of digital pixel data during display of the image represented by the data.

In accordance with the above objects, the present invention provides for a display on a video monitor of digital pixel data. The digital pixel data is received from a host digitizing device which may be a stand alone computer or even an analog to digital system for converting original analog video to digital video. The received digital pixels form the lines of a frame of image data. The lines of digital pixels are used to time modulate a constant intensity CRT beam to accurately control the exposure of a photographic film.

Control over the exposure is effected by scanning each line of the image frame a plurality of times. Each individual line scan or pass for a given line of pixels will display each pixel at one of two constant brightness levels which are conveniently represented as being "ON" or "OFF", OFF corresponding to a black level. By rescanning the individual line a multiple number of times, the film is exposed a multiple number of times. The total exposure produced by each pixel is proportional to the total number of line passes during which the pixel was displayed at the brightness level represented by "ON". Thus, accurate gray scale resolution is achieved based on the number of times the pixel is displayed at the ON brightness level.

As further control over the gray scale resolution, the two brightness levels may be controlled in accordance with each line pass. It is possible to change the brightness intensity for successive scans of the same line, thus providing additional gray scale resolution.

In carrying out the invention in accordance with a preferred embodiment, first and second look-up tables are provided. The first look-up table is organized to provide a single digit, a one or a zero, in response to an applied address. The original pixel data from the host device is used to address a first segment of the look-up table address lines. A line pass counter counting the number of times a given line of pixel data has been displayed controls a second segment of the look-up table address lines.

The operation of the Look-up Table I is such as to specify either a 1 or a 0 in response to the absolute value of the received pixel data, and the particular line pass currently being displayed. The 1 or 0 output level from the Look-up Table I will select one of two brightness levels, corresponding to two CRT beam current settings, for displaying the pixel during another consecutive scan of the same line. When the line pass counter increments, a new location in the Look-up Table I will be selected.

Thus, for each of the times a given pixel is rescanned, the pixel value is either a 1 or a 0. By scanning multiple times as controlled by the line pass counter, it is possible to control the total time of display for the pixel, and accurately control the integrated exposure of the film.

The line pass counter also addresses a second look-up table. The Look-up Table II can select the value of the beam current for the cathode ray tube, thus controlling the CRT spot intensity during each line pass. Thus, an additional control over the total exposure of the film for the plurality of times a given line of pixel data is exposed can be provided.

The present invention can provide a gray scale resolution such that the resulting gray scale level of a pixel corresponds to a unique number of line passes.

The Look-up Table II is advantageous for providing a gamma correction, thus selecting a CRT beam current and spot illumination based upon a predetermined gamma correction curve represented by the contents of a second look-up table.

The invention will reduce the need to calibrate the CRT intensity as described in U.S. Pat. Nos. 4,433,345 and 4,530,011 assigned to the assignee of the present application. As is known from analog video signal processing, the CRT intensity can vary over time due to component aging and other non-linear circuit conditions. The present invention will permit use of a single image intensity represented by a logic one level from the Look-up Table I. The single intensity level can be accurately controlled. Since the exposure of the film is a time modulated function of the single beam intensity, rather than the effect of intensity modulation as in the prior art, the integrated exposure will also be accurately controlled. The use of a single intensity will limit the spot size growth which accompanies fine grain phosphor when irradiated with a varying intensity electron beam. Control over the spot size will of course assist in maintaining precise image detail displayed on the CRT.

DESCRIPTION OF THE PREFERRED EMBODIMENT

Figure 1:
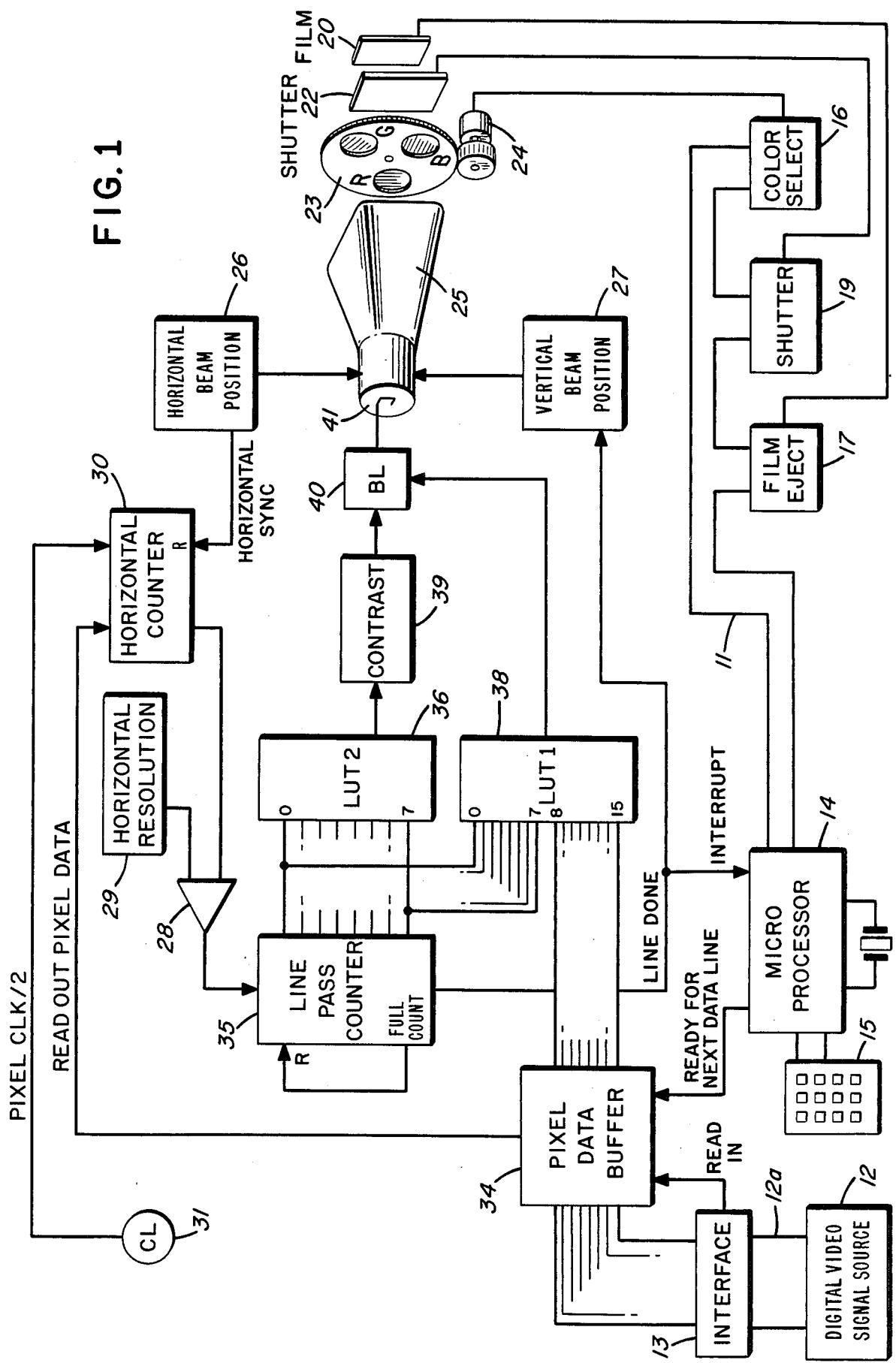
FIG. 1 is an overall general block diagram showing the present invention incorporated in a system for photographing CRT generated images.

Referring now to FIG. 1, there is shown, in block diagram form, a system for creating photographic copies of a CRT-generated image. The CRT 25 is suitable for displaying a panchromatic image of red, green or blue picture detail. The picture detail originates from the digital video signal source 12 which is a rasterizing device for generating lines of digital pixel data for display by the CRT 25. As is common to other devices for photographing CRT images, a color filter wheel 23 is provided which is indexable by index motor 24. Thus, each display of image data can be filtered and used to form a single color image via lens-shutter combination 22 on the film 20.

Controls for selecting the particular color image to be recorded, 16, and for controlling the film eject 17 and lens-shutter combination 19 are provided as is conventional.

A microprocessor 14 will, upon entry of an appropriate command by keyboard 15, effect sequential operation of the filter wheel 23, shutter 22 and film eject 17.

Associated with the cathode ray tube 25 are positioning electronics comprising a vertical beam position circuit 27 and horizontal beam position circuit 26. The beam generated by CRT cathode 41 will accurately sweep a plurality of horizontal positions. The horizontal resolution control 29 and horizontal counter 30 will count up to 1280 horizontal positions along a line of pixel data. A new line is started by synchronizing horizontal beam position circuit 26 by a horizontal synchronization pulse to reset horizontal counter 30. The horizontal resolution control 29 may be a 12 position switch or other means for specifying up to 1280 pixels. As soon as the requisite number of pixels for a line have been counted, comparator 28 resets line pass counter 35.

A pixel data buffer 34 receives at least one complete line of pixel data to be displayed by the CRT 25. Pixel data buffer 34 will be loaded via the data bus 12A with the complete line of video pixel data received from the signal source 12. As will be apparent with respect to the specific embodiment of the pixel data buffer 34, the pixel data buffer may include more than one line of data and provide for reading a second line of video data while processing and generating an image of the first line of pixel data.

Look-up Table I (38) is shown, addressed by the pixel data buffer and line pass counter. The Look-up Table I is organized in an 64K by 1 format. Each memory location represented by the 16 address lines will produce either a 0 or a 1 for blanking or unblanking the CRT beam. A blanking control 40 is operated directly in response to whether a 1 or a 0 is produced from the Look-up Table 38. The address bus for Look-up Table 38 is shared with a line pass counter 35 and with the data buffer 34. Each line of pixel data stored in the pixel data buffer 34 will be displayed a number of times as determined by the maximum count of the line pass counter 35. A pixel clock 31 is connected to the horizontal counter 30. Horizontal counter 30 counts at the pixel clock rate when a READ command is received by the counter. The READ command merely signifies that a full line of data is available for display. The pixel clock 31 will also read out the individual pixels of the pixel data buffer 34. The pixel clock is selected to have a frequency of one half the pixel line rate PIXEL CLOCK/2.

During the creation of a line of pixel data, the memory storage location of Look-up Table I is addressed by the line pass count of line pass counter 35 and the pixel data value from buffer 34. The memory location will specify a 0 or 1 for blanking or unblanking of the CRT beam current. The line of pixel data contained in the pixel data buffer 34 is scanned a plurality of times on the CRT 25, preferably 256 times, but which may be selectable in increments of 2 lines, to expose film 20. Look-up Table I will either expose or blank the particular pixel being read from pixel data buffer 34 depending on the line pass count and value of the pixel data.

Control over the magnitude of the beam current produced by CRT 25 may also effected. Look-up Table II, (36), is organized as an 8 bit wide memory. The contrast control 39 may be an 8 bit input DAC (digital to analog converter) which will set the beam current when the beam current is unblanked in response to data from Look-up Table I. Controlling the beam intensity provides an additional 8 bits of gray scale resolution. Thus, each succeeding exposure of a given line of pixel data may be controlled by Look-up Table II to produce a desired total exposure of the film 20.

When a line of pixel data has been exposed for the number of lines indicated in line pass counter 35, the LINE DONE signal will indicate that the position of the beam of the cathode ray tube 25 is to be indexed downward by the vertical beam position circuit 27 to the position for the next line of pixel data. Also, the microprocessor receives an INTERRUPT to enable data buffer 34 to read in more data. The line pass counter 35 is reset to commence scanning of a second line of pixel data now entered in the pixel data buffer 34.

As will be explained with respect to later Figures, the vertical beam position circuit 27 may be selected to advance less than a full line position to effect a blend operation. The blend operation indexes the line to a new position before the total number of line scans for the line have been completed. Thus, it is possible to provide a continuous picture by reducing the visual effects of image rasterizing on detail, by repositioning the beam to a position intermediate two consecutive lines to effect the blend between successive line passes.

Figure 2:
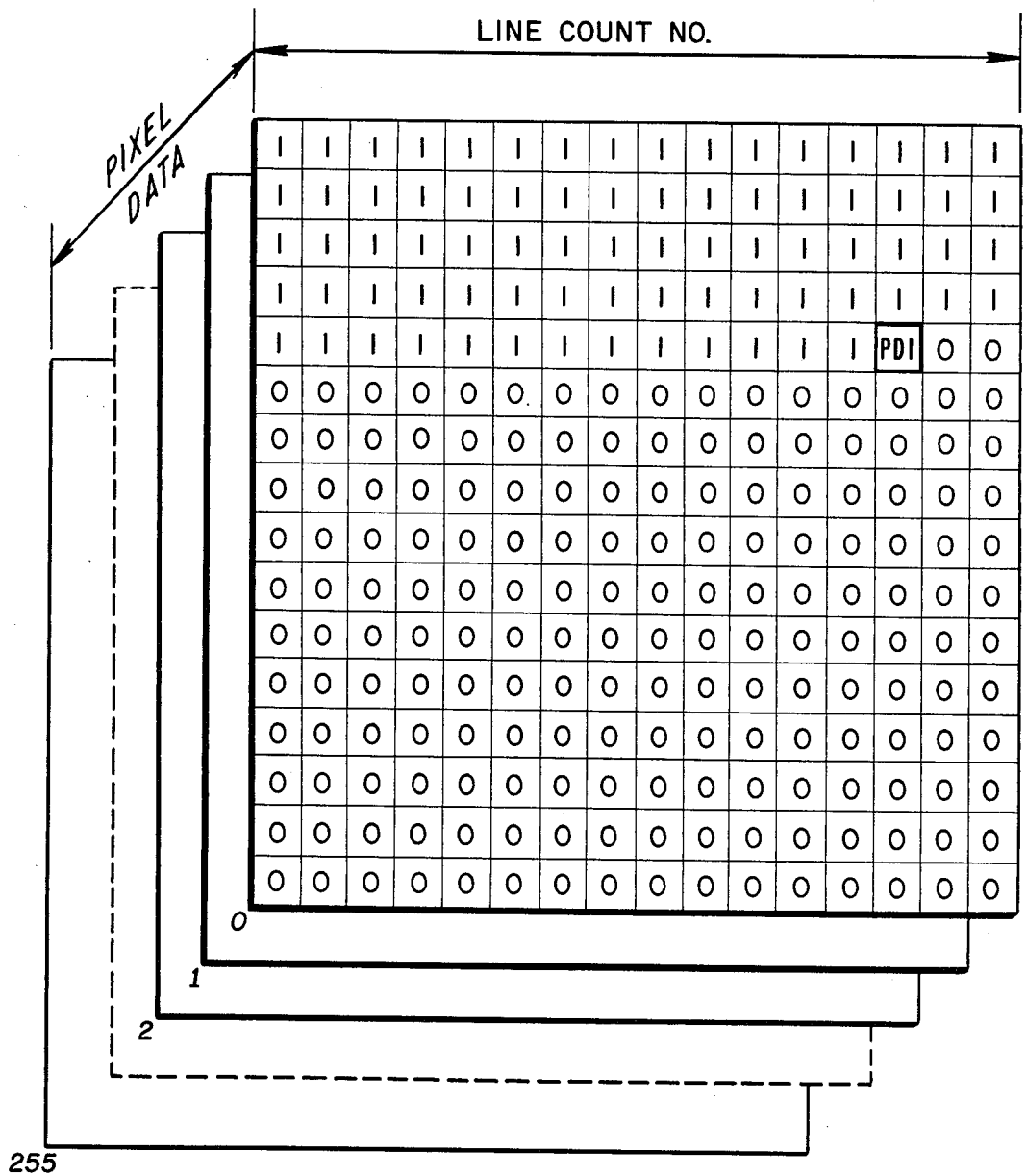
FIG. 2 shows the general organization of the Look-up Table I for controlling pixel exposure.

Having generally described the operation of a preferred embodiment with respect to FIG. 1, the organization of Look-up Table I is shown in FIG. 2. FIG. 2 represents data of the 64K by 1 random access memory which comprises Look-up Table I. Look-up Table I may, of course, be preprogrammed by the microprocessor 14 or may consist of a PROM or other semi-permanent data stored in the 64K by 1 organization.

As shown in FIG. 2, Look-Up Table I may be represented as a plurality of 256 planes, each plane being addressable by the pixel data. The 1 bit wide storage location of each plane may be addressed by the line pass count. A transition location exists in each plane representing the line pass count number at which the beam intensity switches from binary 0 level to the binary 1 level. This transition point will switch from plane to plane. The brighter pixels will be represented by higher order planes, exhibiting a transition location which occurs during higher order line counts. As the line pass count increases to the transition location, the beam of CRT 25 remains blanked. Additional line pass counts address storage locations which contain binary 1 levels for unblanking the CRT, displaying each pixel at a constant intensity. Total exposure of film 20 resulting from each pixel is therefore a function of the transition location of a given plane, and the total number of planes containing a transition location. This transition location identifies the number of times the pixel is unblanked and displayed on the CRT 25. The photographic film exposure will be proportional to the number of times the pixel is displayed with an unblanked CRT 25.

With the foregoing system, it is possible to maintain the beam current at one of two levels, corresponding to a 1 or a 0, unblanking or blanking condition. Maintaining linearity of the CRT brightness and control over the brightness over time, becomes less of a problem when using only a single CRT spot intensity than that which is achieved in conventional video display circuits which require the maintenance of a linear and constant range of spot intensities over time.

Figures 3, 5:
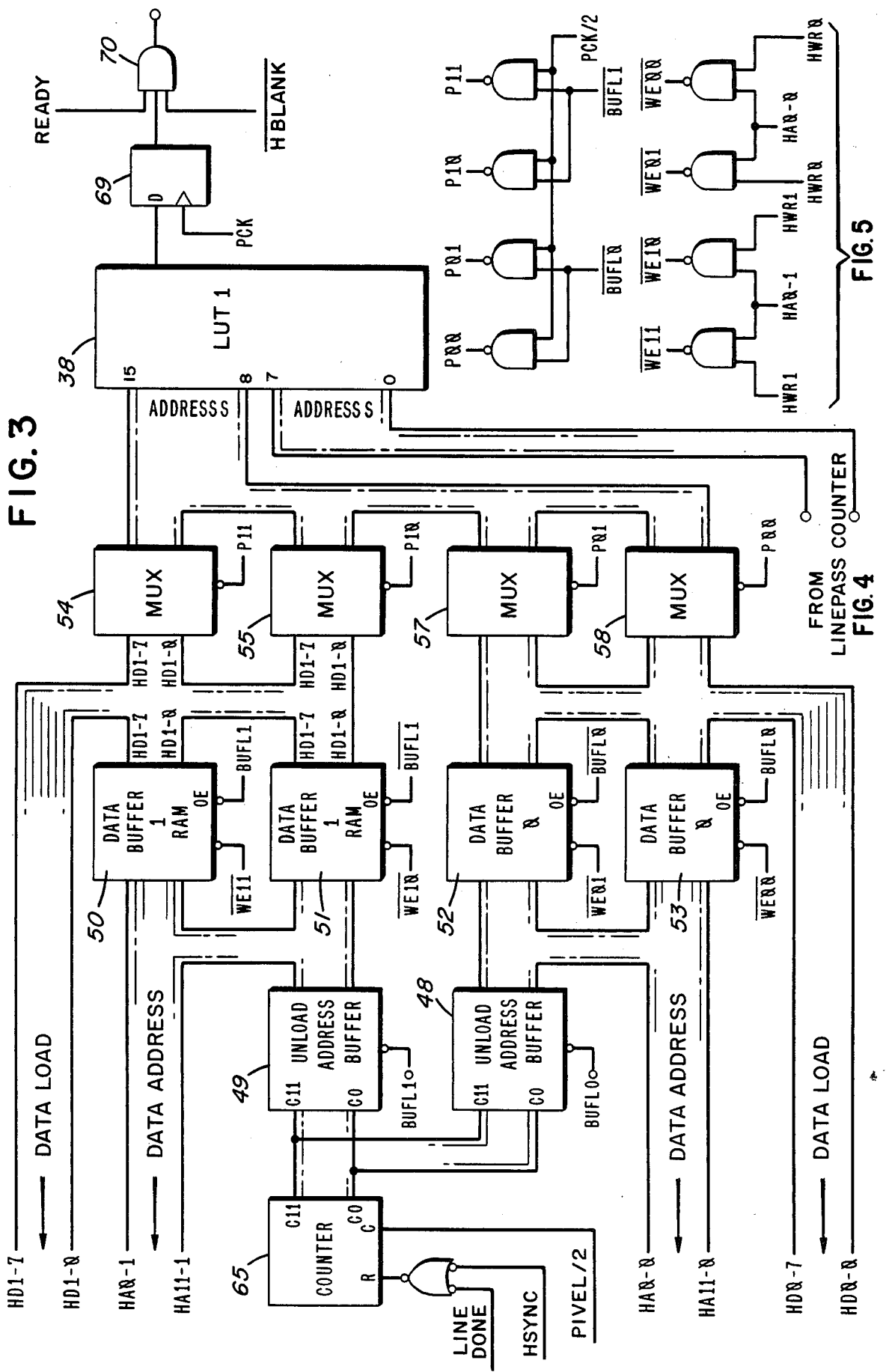
FIG. 3 demonstrates in greater detail the organization of the data buffer and connection to the Look-up Table I.
FIG. 5 demonstrates in block diagram form the interface circuitry between the host rasterizing device and the line buffers of FIG. 1.

Having thus generally described the operation of the preferred embodiment, reference may now be had to FIG. 3 which demonstrates the technique for addressing the Look-up Table I with the pixel data buffer.

Referring now to FIG. 3, there are shown two data buffers, DATA BUFFER 1 and DATA BUFFER 0̸, for storing two lines of pixel data. The circuitry shown in FIG. 3 will buffer the two lines of pixel data and provide for reading each pixel data out of a fully loaded data buffer. The Look-up Table I (38) is addressed over the higher order addresses 8 through 15 by each pixel data read from a given data buffer, and over the lower order addresses 0 through 7 by the line pass counter.

A general organization of DATA BUFFER 1 and 0̸ of FIG. 3 is such that each data buffer includes two, 2K by 8 RAMs 50, 51 and 52, 53. Data buffer 1 and data buffer 0̸ are arranged to permit writing of received host data to one data buffer while the other data buffer is being read during display of the preceding line of pixel data.

During writing of a data buffer, data is received through the interface 13 of FIG. 1 and one of the data buffers is enabled by the processor 14 of FIG. 1. When a given buffer is being enabled by the BUFL 0̸ or BUFL 1 signal, the two RAMs 50, 51 or in the case of buffer 0̸, 52 and 53, are simultaneously addressed. However, the processor will enable only one of the WE (Write Enable) inputs of a RAM at a given time, thus permitting only one RAM to be written while addressing both RAMs. Alternately enabling each RAM 50, 51 or 52, 53, during writing of a given line of pixel data results in one of the RAMs, 50, 52 or 51, 53, receiving even numbered pixel data while the remaining RAM receives odd numbered pixel data for the given line. The loading of each DATA BUFFER 1, 0̸ will be more thoroughly discussed with respect to the discussion of FIG. 5.

The arrangement of FIG. 3 permits one of the data buffers to be written while the other data buffer is read out for displaying a preceding line of pixel data. During readout, the processor of FIG. 1 enables either data buffer 1 or data buffer 0 by BUFL 1, BUFL 0̸ and enables one of latches 49 or 48. The contents of a given data buffer are read out by a counter 65 which is incremented by a pixel/2 clock signal and counts pixel pairs. Thus, both RAMs of a given buffer are addressed through a tri-state latch 49 or 48. The tri-state latches 49, 48 provide the drive to both RAMs of a buffer, reading from both RAMs data stored at the address specified by counter 65. Counter 65 is reset each horizontal sync time and when a line has been completely scanned. The counter has a 12 bit output, permitting addressing of a full line of pixels stored in a given data buffer.

As both RAMs of a data buffer are simultaneously addressed during a read-out of the RAMs, a MUX 54, 55 or (in the case of buffer 0) 57, 58, is enabled to transmit only output data of one of the RAMS. The P0̸0̸, P0̸1, P10̸ and P11 inputs are enables to the respective MUX 58, 57 and 55, 54. During readout of a given buffer each of the two MUX 54, 55 or (in the case of buffer 0) 57, 58 is alternately enabled by P10̸, P11 or (in the case of buffer 1) P0̸1 and P0̸0̸. Thus, only one pixel data is produced to address look-up Table 1.

The RAMs comprising each data buffer have common data lines and address lines connected to receive data from interface 13. During writing of each RAM on alternate pixels, the RAM being currently enabled, is written with data at an address for that RAM.

The lower order addresses of the Look-Up Table I are connected, as was described with respect to FIG. 1, to a line pass counter 35. The line of pixel data contained in each data buffer is displayed a number of times, corresponding to the maximum count of the line pass counter. The data of a given data buffer is held on the higher order address lines 8–15 of Look-Up Table I, while the lower order address lines are cycled from 0 to a maximum count of the line pass counter.

The 1 bit wide output of Look-Up Table I is clocked as a video blanked, and video unblanked, control signal through D flip-flop 69. D flip-flop 69 is clocked by a clock signal at the pixel rate, clocking the Look-Up Table output to one input of an AND gate 70. AND gate 70 will output the pixel video data when the camera is READY and the horizontal blanking signal has not yet occurred. The Look-Up Table I preferably has an access time of 35 nanoseconds or less. The Look-Up Table I may either be a preprogrammed table such as a PROM or EPROM or may be a programmable table, with the processor of FIG. 1 supplying data during an initial calibration sequence. Whether the Look-Up Table I (38) is programmable or prefixed is not essential to the practice of the present invention.

Reading of one or the other of the buffers is accomplished whenever the processor receives an interrupt signal, $\overline{WROX}$, indicating that a particular line has been displayed for the requisite number of line passes and the BUFL signal for that buffer has been generated.

Figure 4:
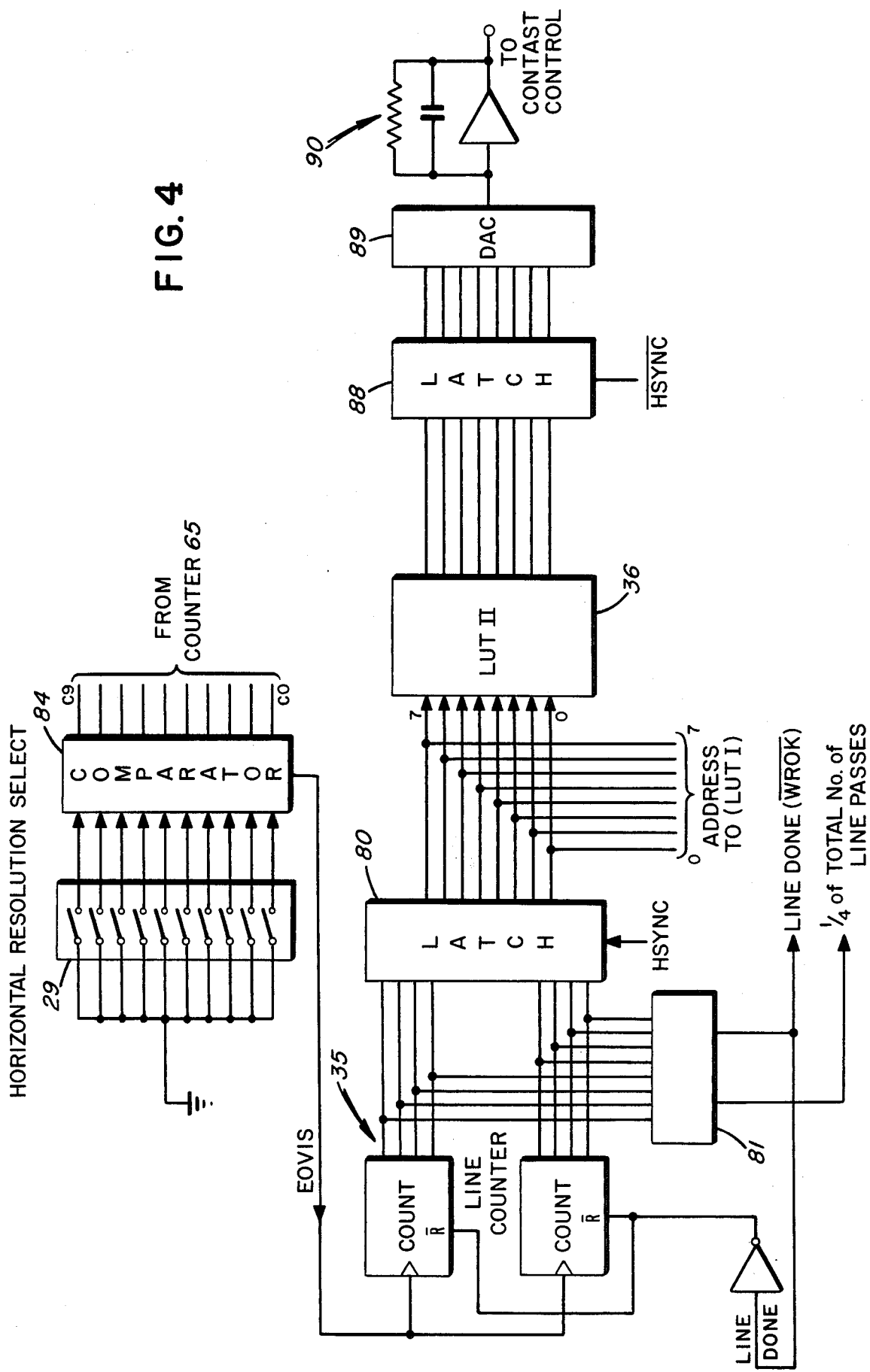
FIG. 4 demonstrates the circuitry for controlling the Look-up Table II for setting beam current in the CRT monitor.

FIG. 4 demonstrates the line pass counter 35, as well as Look-Up Table II and its respective connections to control the level of CRT beam current. The line pass counter 35 is 8 bits wide and is clocked by an end of visible line, EOVIS, signal. The end of visible line signal is generated from counting pixels and comparing the counted pixels with the selected horizontal resolution. A 10 position switch 29 selects a desired horizontal resolution. Comparator 84 compares the desired horizontal resolution with the number of pixels actually read from the pixel counter 65 of FIG. 3, corresponding to the number of pixels which have been displayed for a given line pass.

The EOVIS signal increments the line pass counter 35 at the conclusion of each pass corresponding to a display of a complete line of pixel data. A tri-state latch 80 will receive and hold the count for a sufficient time to address Look-Up Table II during each Horizontal Sync period.

The line pass counter 35 is also decoded in decoder 81 to provide a LINE DONE signal, signifying that a given line of digital pixel data has been exposed the required number of times. Additionally, one-quarter of the total number of required line passes is indicated by decoder 81. These signals from decoder 81 are applied to vertical beam positioner 27 to index the CRT beam vertically to a new position in the case of LINE DONE for starting the exposure of the next line of pixel data. One-quarter of the total number of line passes is used to effect a blend operation wherein the CRT beam can be positioned vertically at an intermediate position between the present line and the next line to be displayed by the CRT. This will accomplish a blend function, effectively reducing the distance between horizontal raster lines of the image.

Look-up Table II (36) will control the CRT beam current. It is contemplated that Look-Up Table II (36) can provide gamma correction for the CRT image. Thus, by addressing Look-Up Table II, (36) an 8 bit binary number is provided for specifying the value of CRT beam current. An output tri-state latch 88 will hold each addressed memory content, latching a new number during each horizontal sync period.

The 8 bit digital to analog converter 89 will generate the requisite analog voltage. The analog voltage will be integrated in integrator 90 and used to control the contrast of the video monitor by setting the beam intensity during unblanking.

The operation of the circuit of FIG. 4 is such that each time a new line is scanned the line pass counter 35 is incremented until a desired number of line passes have been completed. The final line pass initiates the LINE DONE signal for indexing the beam vertically and resetting the line pass counter 35 for the next line of pixel data to be displayed, and sending an interrupt signal $\overline{WROK}$ to the microprocessor. The latches 88 and 80 are operated during the horizontal sync time; the latch 80 also providing the lower order address lines for Look-Up Table I (38) of FIG. 3.

The loading of each of the data buffers, BUF0 and BUF1, of FIG. 3, will now be explained with respect to FIG. 5. FIG. 5 represents the interface between the data buffers BUF 0 and BUF 1 of FIG. 3 and Host rasterizing device 12 also shown in FIG. 5. The following explanation is provided to illustrate one technique for loading each line of pixel data received into the data buffers BUF 0 and BUF 1.

In FIG. 5, there is shown the digital host raster device 12 for supplying a pixel by pixel raster television signal. Each line of the television signal is sent on the pixel by pixel basis over data bus 12a. The IEEE 488 interface will recognize a data point as distinguished from a protocol command. The serial 8 bit pixel data is routed to data buffers 93 and 94 for temporary storage therein while loading one or the other of the data buffers of FIG. 3.

The data buffer 93 is enabled from NAND gate 93a when the buffer 1 of FIG. 3 is to be loaded with a line of pixel data, and the data buffer 94 is enabled by NAND gate 94b when the buffer 0 of FIG. 3 is to be loaded with a line of pixel data. Protocol signals $\overline{DAV}$ and $\overline{ATN}$ along with $\overline{BUFL1}$ and $\overline{BUFL0}$ control the output enables of each data buffer 94 and 93. As was described with respect to the operation of FIG. 3, after a line of data has been displayed for the requisite number of times in accordance with the line pass count, an interrupt will be generated in microprocessor 14 from $\overline{WROK}$ of FIG. 4. At this time, the states of $\overline{BUFL1}$ and $\overline{BUFL0}$ will change such that the data buffer previously loaded will be read and the data buffer of FIG. 3 previously read and displayed will now be loaded.

Each of data buffers 93 and 94 is connected to the appropriate data lines of first and second line buffers DATA BUFFER 1 and DATA BUFFER 0 of FIG. 3. The HD0 and HD1 buses from data buffers 93 and 94 are connected to the appropriate buffer of FIG. 3.

In a similar manner, one or the other of the buffers is addressed during loading of each of the received pixel data. Address buffers 97 and 98 are similarly enabled by either the $\overline{VREN\ 1}$ line or the $\overline{VREN\ 0}$ line, identifying the particular buffer being addressed.

A 12 bit address counter 96 is shown which is toggled from signals received from the IEEE 488 interface. Each new address from the address counter 96 will be passed by one or the other of address buffers 97 and 98 depending on the state of $\overline{VREN0}$ or VREN1 for addressing the appropriate data buffer of FIG. 3. Additionally, a LINE FULL signal is generated from a comparator 99, indicating that all pixels of a given line have been received. Comparator 99 receives a data signal from a set of switches 101 which will indicate the number of pixels per line. The LINE FULL signal will result in the protocol for the IEEE interface signalling to the host raster device that a complete line of pixel data has been received, halting the transmission of further data, as well as resetting counter 96 as well as reset counter 96.

The standard IEEE 488 protocol signals are shown connected to operate in synchronism with the pixel clock PCK/2. A series of flip flops 101 will, in response to each received protocol signal $\overline{DAV}$, advance the address counter 96 as well as signal to the IEEE 488 with $\overline{DAC}$ that another data point may be accepted. A request for a new data point is made by RFD.

Returning briefly to FIG. 3, there are shown signals $\overline{WE00}$, $\overline{WE01}$, $\overline{WE10}$ and $\overline{WE11}$ for generating enables for writing to each of the RAMs 50, 51, 52 or 53 for loading a given data buffer. HA0-1 and HA0-0 being the least significant bit of each data address bus for BUFFER1 and BUFFER0 will produce alternate write enable signs $\overline{WE11}$, $\overline{WE10}$, or $\overline{WE01}$ and $\overline{WE00}$. HWR0 and HWR1 are enables produced by address buffers 97 and 98 when each has been enabled. By decoding the appropriate address lines, one of the buffer RAMs will store even numbered pixel data while the remaining buffer RAM will store odd numbered pixel data. Thus, the even data will be stored in one data buffer RAM and the odd data in the other of the data buffer RAMs.

Thus, there is described a technique for loading through an IEEE 488 interface each of the data buffers of FIG. 3, while the other is being displayed. It is clear that other than the pixel by pixel data format may be utilized. For instance, run length encoding or any other technique could be suitably transmitted over the data bus 12a and loaded, using the modified circuitry of FIG. 5, into the data buffers of FIG. 3.

What is claimed is:

1. An apparatus for generating pixel images for exposing a photographic film comprising:
    a CRT for displaying a plurality of lines of pixel data;
    a source of binary data for specifying the gray scale of a line of pixels to be displayed;
    a line pass counter for indicating the maximum number of times each line of said pixels is to be scanned;
    means for scanning each line of pixels said maximum number of times;
    a first memory of storage locations having address lines connected to said line pass counter and said source of binary data, said memory producing a binary one or zero for enabling and disabling a CRT beam, whereby during scanning each line of pixels said maximum number of times, said CRT beam is modulated to produce a total light output equal to each pixel gray scale value;
    a second memory of storage locations having address lines connected to said line pass counter, said second memory defining a value of beam current for said CRT;
    means for controlling said beam current proportional to said value of beam current produced by said second memory, whereby each of said pixels produces a total light output over said maximum number of scans having a gray scale resolution determined by said line pass counter maximum count, and the number of bits in each of said second memory locations.

2. The apparatus of claim 1 further comprising a vertical beam positioning means which indexes said beam to scan subsequent lines of pixels after scanning each line of pixels a maximum number of times.

3. A video image display apparatus for generating image pixels for exposing a photographic medium comprising:
    a cathode ray tube monitor having a scanning beam which can be blanked on and off, and which includes an input for controlling the current level of said scanning beam;
    a source for supplying binary pixel data in synchronism with the scanning of said scanning beam;
    a line pass counter for specifying a number of times each line of said pixel data is to be scanned on said CRT, said line counter connected to be incremented after each scan of said beam until said scanning beam has been scanned said specified number of times;
    means for controlling the blanking and unblanking of said scanning beam in accordance with each received pixel data and the count of said line counter;
    means for controlling the beam current in proportion to each received pixel data and count in said line pass counter where each pixel is displayed having a gray scale resolution proportional to the number of times said beam is unblanked and the level of said beam current.

4. The video image display apparatus of claim 3 further comprising:
    means for indexing said beam when said line pass counter is decremented to zero to a position for scanning a subsequent line.

5. The video image display apparatus of claim 3 wherein said means for controlling blanking comprises:
    a look-up table having a plurality of single digit storage locations, said look-up table having a plurality of address lines, a portion of said address lines connected to said line pass counter and another portion connected to receive said pixel data, whereby binary data is produced for controlling unblanking of each line based upon the value of said pixel data and the contents of said line pass counter.

6. The video image display apparatus of claim 3 wherein said means for controlling the beam current comprises a look-up table having therein multi-digit binary words, said look-up table having a plurality of address lines, a portion of said address lines connected to said line pass counter and another portion connected to receive said pixel data, whereby a beam current is selected proportional to said line pass counter contents and said pixel data.

7. A method for generating photographic copies of CRT images formed from a plurality of lines of pixels, said lines forming a complete frame of picture detail comprising:
    generating digital data representing the image brightness of a plurality of pixels in each line forming said image;
    consecutively scanning a CRT beam a multiple number of times over a line corresponding to each line of pixel data,
    counting the number of times said CRT is consecutively scanned over said line;
    displaying each pixel contained in said line during said scanning with a substantially constant beam intensity for a number of scans, said number of scans being proportional to the brightness of said pixel; and
    exposing a photographic film with said CRT whereby the total exposure of said photographic film is proportional to the number of scans for which said pixel is displayed at said substantially constant beam intensity.

8. The method of claim 7 further comprising:
changing the intensity of said CRT beam to a new intensity level during scanning of each line.

9. The method of claim 7 wherein said beam intensity is changed during scanning each line a multiple number of times to effect gamma correction for said image.

10. A method for generating photographic copies of a CRT image formed from a plurality of lines of pixels, said lines forming a complete frame of picture detail comprising;
generating digital data representing the brightness of a plurality of pixels in each of said lines forming said image;
consecutively scanning a CRT beam to generate each line of said CRT formed image a multiple number of times;
counting the number of consecutive times each line is scanned;
addressing a look-up table with each digital data representing a pixel, and with the number of consecutive times each line is scanned in synchronism with the scanning of said line, said look-up table producing a binary 1 or 0 at each addressed location corresponding to a position for displaying said pixel;
unblanking said CRT beam to produce a constant intensity beam which forms said pixel each time said look-up table produces a binary 1; and
exposing a photographic film to each pixel formed by said CRT beam, whereby each pixel of said image exposes said photographic film to an exposure level proportional to the number of times said look-up table produces a binary 1 at the time said pixel is displayed.

11. The method of claim 10 further comprising:
addressing a second look-up table with a count representing said number of consecutive times each line is scanned; and
controlling the beam intensity of said CRT beam in accordance with the data provided from said second look-up table.

12. The method of claim 10 further comprising positioning said CRT beam to a position between a present line being scanned and an adjacent line to be scanned before completing said multiple number of consecutive scans.

* * * * *

UNITED STATES PATENT AND TRADEMARK OFFICE
CERTIFICATE OF CORRECTION

PATENT NO. : 4,769,715

DATED : September 6, 1988

INVENTOR(S) : Samuel Feldman et al.

It is certified that error appears in the above-identified patent and that said Letters Patent is hereby corrected as shown below:

On the title page, Item [73] should read

-- [73] Assignee: Matrix Instruments, Inc., Orangeburg, N. Y. --.

Signed and Sealed this

Seventeenth Day of January, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,769,715

DATED : September 6, 1988

INVENTOR(S) : Feldman et al

It is certified that error appears in the above-identified patent and that said Letters Patent is hereby corrected as shown below:

In column 4, line 14, change "resets" to --clocks--.

In column 9, line 2, delete "as well as reset"; delete line 3.

Signed and Sealed this

Twenty-ninth Day of August, 1989

Attest:

DONALD J. QUIGG

*Attesting Officer*   *Commissioner of Patents and Trademarks*